Patented Aug. 16, 1932

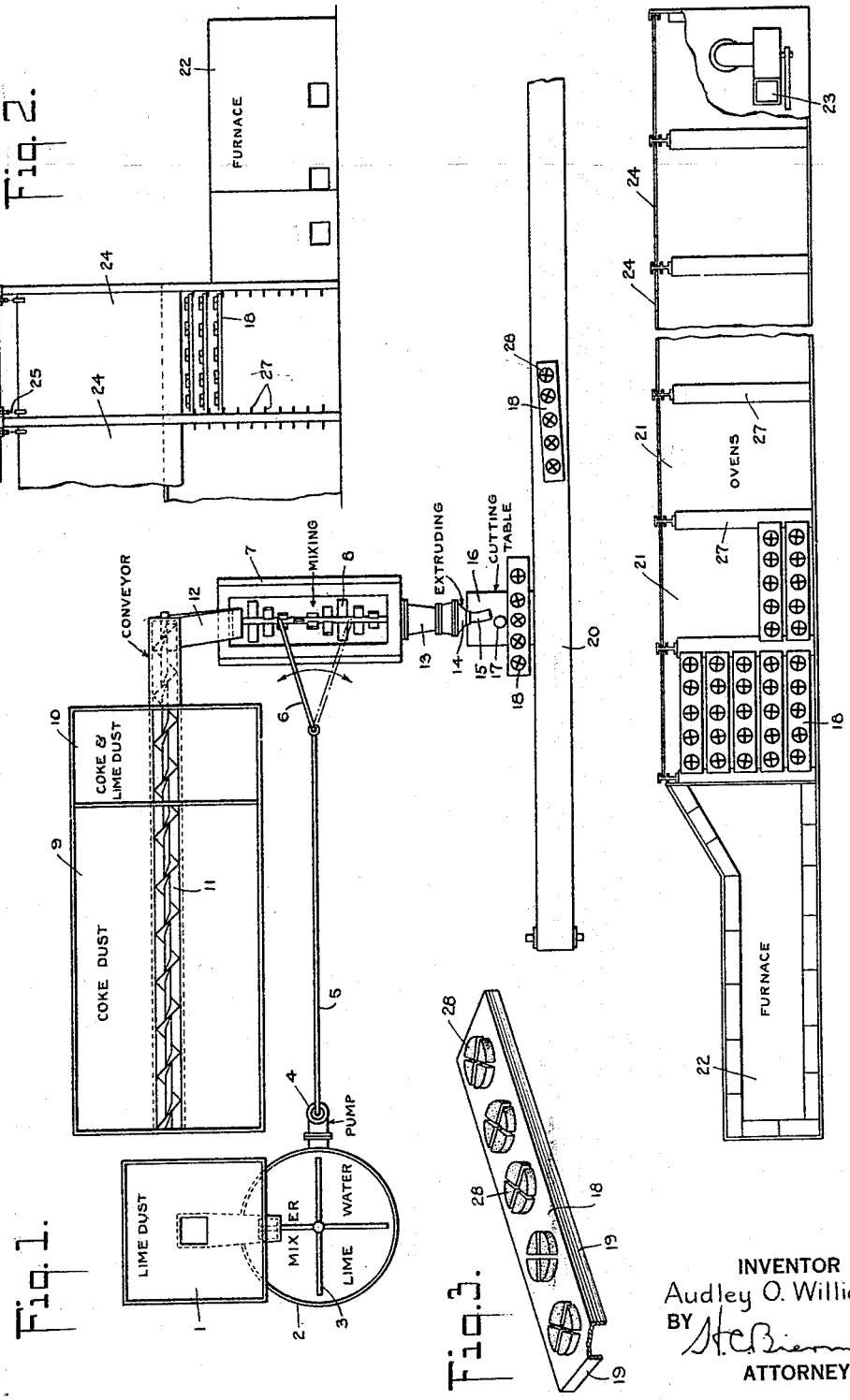

1,872,202

UNITED STATES PATENT OFFICE

AUDLEY O. WILLIAMS, OF NIAGARA FALLS, ONTARIO, CANADA, ASSIGNOR TO AMERICAN CYANAMID COMPANY, OF NEW YORK, N. Y., A CORPORATION OF MAINE

METHOD OF MAKING CALCIUM CARBIDE

Application filed September 1, 1926. Serial No. 133,022.

This invention relates to the manufacture of calcium carbide and the like, more particularly to a method in which materials previously unsuitable are made available for the production of calcium carbide and similar substances.

As is well known, calcium carbide is made from a mixture of burnt lime and coke, usually in the proportion of about sixty parts of lime to forty parts of coke, the mixture being fed into an electric arc furnace where the high temperature melts the two ingredients and causes them to combine with the formation of calcium carbide which contains other substances because of an incomplete reaction and because of the presence in the raw materials of various impurities. It has been found that the raw materials for the making of calcium carbide should be in granular form or in particles of relatively large size, because fine material is not acted upon by the heat of the electric furnace but is blown out of the top thereof by the generation of gases in the reaction zone. It has been conservatively estimated that the amount of material thus lost in the form of dust constitutes 8% to 10% of the total amount of material going into the furnaces.

The present invention is intended to obviate this loss of raw materials, it being among the objects thereof to provide a modification of the method of making calcium carbide whereby the waste of raw material is minimized.

It is also among the objects of this invention to provide a method in which fine material is utilized and is fed into the furnace in a modified form and the efficiency of the furnace increased thereby.

In practicing my invention I remove fine material or dust from the lime and from the coke, and also from the lime and coke mixture which is fed to the furnace. Part or all of the lime dust thus obtained is treated with water to form a solution of lime or lime water, which is then used as a binder for coke dust or a mixture of lime dust and coke dust. A relatively large percentage of lime is incorporated in the mixture and I utilize at least 15% of lime but I may use up to and over 35% thereof. The plastic mass formed in the mixture is extruded from a suitable press and is cut up into briquets of suitable size which are placed upon trays or pallettes and dried, preferably in an oven at a relatively low temperature, sufficient only to drive off the excess of water in the briquets. In some cases I may provide such a proportion of lime dust to coke dust in the briquets that the briquets constitute a complete charge for the furnace and they are therefore fed into the furnace without any additions of other materials and smelted down to form calcium carbide. However, in most cases I have found it to be more convenient, principally because the amount of coke dust formed is considerably greater than the amount of lime dust formed, to make a briquet containing, say, 25% to 30% lime and 70% to 75% of coke dust and add to briquets of this kind a sufficient amount of granular or lump lime to provide the proper portion of ingredients for making calcium carbide. Furthermore, I may add to such a mixture additional granular lime and coke to increase the amount of charge for the furnace whereby the briquets constitute but a small fraction of the charge instead of constituting all or the major portion thereof.

In the accompanying drawing constituting a part thereof and in which like reference characters indicate like parts:

Fig. 1 is a plan view, somewhat diagrammatic, showing an apparatus adapted for carrying out the briquetting portion of my method; and with a drying unit adjacent thereto.

Fig. 2 is a fragmentary, side elevational view of the oven used for drying the briquets, and Fig. 3 is an enlarged, perspective view of a tray or pallette for holding the briquets during one stage of the operation.

There is provided a bin 1 for lime dust having a connection with a tank 2, containing a stirrer 3, whereby lime dust from the bin 1 may be mixed with water to provide the lime water binder which is then forced by pump 4 through pipe 5 and flexible hose 6 into the mixer 7, containing a rotating stirrer 8 of the paddle or preferably of the screw conveyor type. There are further provided bins 9 and 10 for holding coke dust, and coke and lime dust, respectively, provided with a common conveyor 11 discharging into chute 12 which guides the material into the mixer 7. The material in the mixer is fed forward through the extruding portion 13 of the machine, the material issuing from the nozzle 14 in the form of a rod 15 which moves along the cutting table 16. An operator cuts the rod 15 into slices 17 which are placed upon the pallettes 18, which are formed with downwardly extending edges 19 for rigidity. The slices 17 may be further cut into sections 28 as shown most clearly in Fig. 3, and the pallettes 18 are placed upon endless conveyor belt 20 and are moved thereby to the proper curing oven.

The drying apparatus for the briquets consists of a series of ovens 21 provided with a furnace 22 on one end thereof, the products of combustion of the furnace passing successively through the several ovens and out through stack 23 at the opposite end of the apparatus. Each of the ovens is provided with a sliding door 24 in the front thereof, the said door being mounted on counter-weighted chains 25 passing over pulleys 26. The ovens are further provided with a series of spaced ledges 27 for the reception of the trays or pallettes 18.

In the operation of my method I may first provide a binder of lime water in the tank 2 and feed the same through pipes 5 and 6 to mixer 7 where an operator sprays the binder upon the material being agitated in the said mixer. This material may be coke dust from bin 9 which is fed by means of conveyor 11 and chute 12 to the mixer 7 or it may be a mixture of coke dust and lime dust from the bin 10 or it may be material in suitable proportions from both bins 9 and 10. The proper amount of lime water for the making of the briquets is gauged by the operator at the mixer and is added thereto as the dust passes through the same. The plastic mass thus formed therein is then extruded onto the cutting table 16 where an operator cuts off sections therefrom with a blunt knife and places them on the pallettes 18. He may also cut each individual section 17 into four parts 28 so that the individual briquets may be of smaller size to facilitate subsequent drying and handling. When a pallette 18 has been covered with sections 17 it is placed on the endless belt 20 and it travels to a point opposite the oven to be filled, where one or more operators removes the same and places it within the oven, as shown in Figures 1 and 2. When an oven has been filled, the door 24 is closed and the joints or cracks are filled with a plastic mixture, such as clay, in order to prevent leakage of gases therefrom during the heating period. When the ovens of one bank are filled, the furnace is fired and hot products of combustion pass through the ovens drying the briquets. The pallettes are then removed and the briquets are placed on the endless belt 20 which moves them to a proper storage point for use in the carbide furnace.

If the briquets contain the proper proportions of raw materials for the making of calcium carbide, they are fed directly into the furnace without any additions thereto, but generally, as explained above, it is desirable to add granular lime or coke or both to complete the furnace charge. For example, if about 25% to 27% of lime has been incorporated into the briquets, it is necessary to add 800 pounds of granular lime to each 1,000 pounds of briquets in order to obtain the correct proportions for the furnace charge.

By my method of briquetting the lime dust and coke dust I have been able to add 7% to 8% to the amount of carbide produced from a given amount of raw material by reason of charging into the furnace material which had previously gone to waste. The cost of the operation of briquetting is rather low and I find that I obtain a net saving of about $6.00 per ton of dust briquetted.

Not only do I save waste material but more important still is the result of using this material on the operation of the furnace itself. I have found that the briquetted material is more effective than the loose granular material and fines which had hitherto been exclusively used in the furnace. It would appear that in a briquet there is a more intimate contact between the particles of lime and coke, giving a quicker reaction therebetween, causing the fusion to take place at a higher rate and making the operation of the furnace smoother and less subject to fluctuations. I have found that one ton of briquets produces as much calcium carbide as about 1.1 tons of the ordinary granular and fines mixture. Furthermore, the making of a ton of carbide from the briquets requires about 4% to 6% less power than that necessary to form the same amount of carbide from the old granular and fines mixture. By the use of briquets less material is blown out of the furnace in the form of dust.

It has always been considered essential that the lime used in a carbide furnace be perfectly anhydrous in order to avoid the waste of electrical energy required for driving off the water from the lime. My briquets contain a considerable amount of water combined with the lime but I find that in the use thereof no additional energy is necessary as water is given off from the hydrated lime at a temperature of about 450° C. which occurs at the top of the furnace where the material is fed in. The heat utilized for removing the water is waste heat which ordinarily is radiated and lost.

Although I have described my invention, setting forth a specific procedure and apparatus for producing briquets which are used in the furnace for making calcium carbide, it is apparent that my invention is not limited to the details mentioned as various changes may be made therein within the scope of this invention. For instance, I may change the proportions of lime to coke in the briquets so that the lime may be the major constituent and I may add coke to the briquets in the furnace operations to provide the proper proportions of raw materials. The several steps in the production of the briquets may be different from those outlined, as for example, the briquets may be dried in the air or may be continuously fed through a tunnel kiln and thence directly into the furnace. The drying of the briquets may take place, at least partially, at the top of the furnace as they are fed towards the reaction zone. Instead of hand operations in the mixing of the plastic mass and the extruding and cutting of the briquets, I may substitute automatic machinery for this purpose. Instead of feeding lime water directly from the mixer 2 through pipes 5 and 6 by means of pump 4, I may utilize a storage tank at a high level into which the lime water is pumped and from which it may be fed by gravity to the mixer 7. These and other changes may be made in my invention, the scope thereof being defined in the claims appended hereto.

What I claim is:

1. A method of making calcium carbide which comprises providing a mixture of coke, lime and water, forming briquets therefrom, drying the briquets and smelting the same together with additions of lime and coke.

2. A method of making calcium carbide which comprises providing a mixture of coke dust, lime dust and water, forming briquets therefrom, drying the briquets and smelting the same together with additions of lime and coke.

In testimony whereof, I have hereunto subscribed my name this 30th day of August, 1926.

AUDLEY O. WILLIAMS.